United States Patent
Singh et al.

(10) Patent No.: US 8,095,145 B2
(45) Date of Patent: Jan. 10, 2012

(54) METHOD AND SYSTEM OF DISTRIBUTING TRANSMISSIONS IN A WIRELESS DATA TRANSMISSION SYSTEM

(75) Inventors: Rajendra Singh, Alexandria, VA (US); George Ron Olexa, Gainesville, VA (US)

(73) Assignee: Telcom Ventures, LLC, Alexandria, VA (US)

( * ) Notice: Subject to any disclaimer, the term of this patent is extended or adjusted under 35 U.S.C. 154(b) by 808 days.

(21) Appl. No.: 12/053,000

(22) Filed: Mar. 21, 2008

(65) Prior Publication Data

US 2008/0242330 A1 Oct. 2, 2008

Related U.S. Application Data

(60) Provisional application No. 60/913,153, filed on Apr. 20, 2007.

(51) Int. Cl.
*H04W 72/00* (2009.01)
*H04K 3/00* (2006.01)

(52) U.S. Cl. .......................... 455/454; 455/427; 455/447

(58) Field of Classification Search .......... 455/427–429, 455/436, 447–448, 454
See application file for complete search history.

(56) References Cited

U.S. PATENT DOCUMENTS

| | | | |
|---|---|---|---|
| 3,742,498 A | 6/1973 | Dunn | |
| 4,599,647 A | 7/1986 | George et al. | |
| 5,444,697 A | 8/1995 | Leung et al. | |
| 5,584,046 A | 12/1996 | Martinez et al. | |
| 6,522,644 B2 | 2/2003 | Bergkvist | |
| 6,892,068 B2 | 5/2005 | Karabinis et al. | |
| 7,149,526 B2 | 12/2006 | Karabinis et al. | |
| 2001/0038674 A1 | 11/2001 | Trans | |
| 2002/0012381 A1 | 1/2002 | Mattisson et al. | |
| 2002/0177465 A1 | 11/2002 | Robinett | |
| 2004/0072539 A1 | 4/2004 | Monte et al. | |
| 2004/0198312 A1 | 10/2004 | Jarett | |
| 2005/0031045 A1 | 2/2005 | Mayor et al. | |
| 2005/0164701 A1* | 7/2005 | Karabinis et al. | 455/428 |
| 2005/0176379 A1 | 8/2005 | Grindahl et al. | |
| 2006/0111041 A1 | 5/2006 | Karabinis | |
| 2006/0135070 A1 | 6/2006 | Karabinis | |
| 2006/0205367 A1 | 9/2006 | Karabinis | |

FOREIGN PATENT DOCUMENTS

| | | |
|---|---|---|
| JP | 2002-084261 | 3/2002 |
| JP | 2003-032207 | 1/2003 |
| JP | 2003-333012 | 11/2003 |
| WO | WO 01/89102 | 11/2001 |

(Continued)

OTHER PUBLICATIONS

International Search Report issued in Application No. PCT/US06/025268 mailed Oct. 14, 2008.

(Continued)

*Primary Examiner* — Lee Nguyen
(74) *Attorney, Agent, or Firm* — DLA Piper LLP US

(57) ABSTRACT

A method and System for communicating between a mobile device, and first and second transceivers are described. The second transceiver is positioned in an area covered by the first transceiver. The first transceiver and the mobile device can exchange data on at least one of a plurality of channels. The mobile device transmits a first signal to the first transceiver on the at least one of a plurality of channels. The second transceiver transmits a second signal to the mobile device on a channel outside of the plurality of channels.

33 Claims, 7 Drawing Sheets

FOREIGN PATENT DOCUMENTS

| WO | WO 02/091631 | 11/2002 |
| WO | WO 2004/100501 | 11/2004 |

OTHER PUBLICATIONS

Written Opinion issued in Application No. PCT/US06/025268 mailed Oct. 14, 2008.
Office Action issued in U.S. Appl. No. 11/262,975, mailed Nov. 10, 2008.
File History of U.S. Appl. No. 11/262,975.
File History of U.S. Appl. No. 12/037,475.
Office Action issued in U.S. Appl. No. 11/615,412 mailed Oct. 28, 2009.
International Search Report issued in Application No. PCT/US08/057818 Mailed Jun. 26, 2008.
Written Opinion issued in Application No. PCT/US08/057818 mailed Jun. 26, 2008.
International Search Report issued in Application No. PCT/US08/054985 mailed Jun. 27, 2008.
Written Opinion issued in Application No. PCT/US08/054985 mailed Jun. 27, 2008.
International Preliminary Report on Patentability issued in International Application No. PCT/US2006/025268, mailed Dec. 11, 2008.
"Frequency Division Multiple Access" Definition; McGraw-Hill Dictionary of Scientific and Technical Terms; Sixth Edition; 2003; p. 854.
English Translation of Office Action issued in Chinese Application 200680050379 on Dec. 14, 2010.
Notice of Allowance issued in U.S. Appl. No. 11/262,975 mailed Apr. 30, 2009.
Office Action issued in related U.S. Appl. No. 11/262,975, mailed Apr. 29, 2008.
International Search Report Issued in related International Application No. PCT/US06/62566, mailed Sep. 26, 2007.
Israfil Bahceci et al., Presentation: Diversity Combining for Fading Channels, 13 pages, Nov. 23, 2004.
Michael W. Thelander, "WIMAX or WIBRO: Similar Names, Yet Dissimilar Technologies", Signal Resarch Group, Apr. 2006.
Kari Pietikainen, "Orthogonal Frequency Division Multiplexing", http://www.comlab.hut.fi/opetus/333/lectures.html, pp. 1-5, Feb. 22, 2005.
"Orthogonal Frequency-Division Multiplexing", http://en.wikipedia.org/w/index.php?title=Orthogonal_frequency-division_multiplexing&pri..., 7 pages, printed Jan. 3, 2006.
"806.16E: IEEE Standard for Local and Metropolitan Area Networks: Part 16: Air Interface for Fixed and Mobile Broadband Wireless Access Systems: Amendment 2: Physical and Medium Access Control Layers for Combined Fixed and Mobile Operation in Licensed Bands and Corrigendum 1", IEEE Computer Society and IEEE Microwave Theory and Techniques Society, pp. iv-xxxix and 1-51, Feb. 28, 2006.
Office Action issued in Russian Appl 2008131934 on Jun. 23, 2010.
English Translation of Office Action issued in Russian Appl 2008131934 on Jun. 23, 2010.
Response filed in Russian Appl 2008131934 to Office Action dated Jun. 23, 2010.
Supplemental Search Report issued in EP 08744178 on Mar. 31, 2011.
English Translation of Office Action issued in Chinese Appl 200680024897.5 on May 25, 2011.
English Translation of Office Action issued in Chinese Appl 200680080379.0 on Jun. 22, 2011.
File History of U.S. Appl. No. 11/615,412.
File History of U.S. Appl. No. 12/508,942.
Japanese Office Action issued in JP2008-549524 on Jul. 22, 2011.
English Language Translation of Japanese Office Action issued in JP2008-549524 on Jul. 22, 2011.
English Language Abstract of JP 2002-084261 published on Mar. 22, 2002.
English Language Translation of JP 2002-084261 published on Mar. 22, 2002.
English Language Abstract of JP 2003-032207 published Jan. 31, 2003.
English Language Translation of JP 2003-032207 published Jan. 31, 2003.
English Language Abstract of JP 2003-333012 published Nov. 21, 2003.
English Language Translation of JP 2003-333012 published Nov. 21, 2003.
Li Shihe; TD-SCDMA Third Generation Mobile Communication System Standard; the People's Posts and Telecommunications Press; pp. 73 (partial English Translation), Feb. 29, 2004.
Li Fangvvei; Mobile Communication Principle and System; the South West Normal University Press; pp. 10 (Partial English Translation) Mar. 31, 2004.

* cited by examiner

Just before the MSS – to – TPC Hand Off

Earth to space     Space to earth

Just after Handoff

Earth to space  Space to earth

US 8,095,145 B2

METHOD AND SYSTEM OF DISTRIBUTING TRANSMISSIONS IN A WIRELESS DATA TRANSMISSION SYSTEM

CROSS-REFERENCE TO RELATED APPLICATIONS

This application is based on and derives benefit of the filing date of the U.S. Provisional Patent Application No. 60/913, 153, filed on Apr. 20, 2007, which is related to U.S. Provisional Patent Application No. 60/908,289, filed on Mar. 27, 2007, the contents of each are incorporated herein by reference.

FIELD OF THE INVENTION

Methods and apparatuses consistent with the present invention relate to communications by a mobile device with a plurality of transceivers, and more particularly, to a method and system of conserving power in a wireless data transmission system.

DETAILED DESCRIPTION OF EMBODIMENTS OF THE INVENTION

Figure 1A:
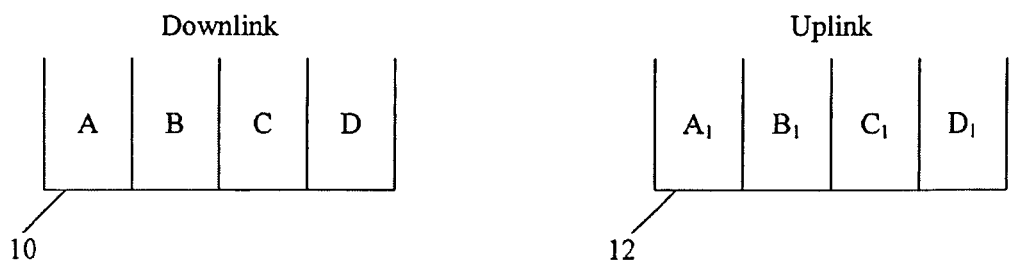
FIG. 1A illustrates an allocation of channels in a satellite spot beam.

FIG. 1A illustrates an allocation of channels in a satellite spot beam. Satellite systems operating with multiple spot beams can implement frequency reuse. Each spot beam in the multiple spot beams can deploy only a fraction of the total spectrum available for the satellite system. For example, if a total available spectrum is 10 MHz (5 MHz for earth-to-space segment and 5 MHz space-to-earth segment) and if a satellite were to use a 10 spot beam reuse pattern, any given beam can use 0.5 MHz (i.e., 5 MHz/10). If a satellite uses a large number of spot beams (e.g., over 200), the satellite can be power constrained before it runs out of radio spectrum.

A satellite spot beam transceiver may transmit data over multiple channels. Each channel can have an assigned frequency. According to an embodiment of the present invention, a transceiver can transmit over any of the four channels 10 labeled A, B, C, D, respectively, as illustrated in FIG. 1A. Of course, any number of channels can be provided. In a downlink situation, communication from a satellite transceiver to a mobile device (MD) will be over one of those channels, for example, channel A.

In an uplink earth-to-satellite communication link, a mobile device (MD) may transmit data to a satellite transceiver. In this data transmission, in the embodiment illustrated in FIG. 1A, there are four possible channels 12 labeled A1, B1, C1, D1, respectively. Channel A1 corresponds to channel A mentioned above. That is, channels A and A1 form a channel pair. In other words, channel A refers the half of the channel used for sending data from a satellite to a terrestrial device on the earth (i.e., the downlink). Channel A1, on the other hand, refers the other half of the channel for sending data from a terrestrial device to the satellite (i.e., the uplink). Similarly, this is the case for the remaining channel pairs B/B1, C/C1, and D/D1.

In a satellite-to-earth communication link, a satellite transceiver may transmit a signal to a mobile device (MD). The satellite-to-earth communication may be part of a Mobile Satellite System (MSS). The satellite-to-earth communication link may be referred to as a mobile satellite system communication downlink. In an earth-to-satellite communication link, a mobile device may transmit a signal to a satellite transceiver. The earth-to-satellite link can be referred to as a mobile satellite system communication uplink. In a base station-to-mobile device communication link, a base station may transmit a signal to a mobile device. In a mobile device-to-base station communication link, a mobile station may transmit a signal to a base station.

Figure 1B:
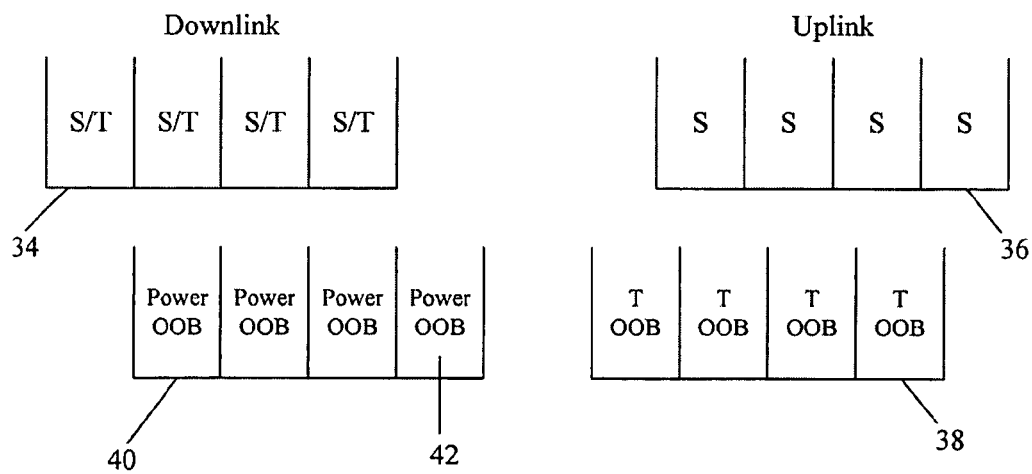
FIG. 1B illustrates an allocation of channels in a satellite spot beam, according to an embodiment of the present invention.

FIG. 1B illustrates an allocation of channels in a satellite spot beam, according to an embodiment of the invention. In this embodiment, one or more of a plurality of channels 34 can be used as either a satellite (S) channel and/or a terrestrial (T) channel in a downlink transmission. The plurality of channels 34 are dual downlink S/T channels that can allow both a satellite transceiver and a base station to communicate to a mobile device on the one or more of the plurality of channels 34. Furthermore, in accordance with the co-channel reuse, the data transmission uplinks 36 can include a plurality of uplink satellite channels.

A plurality of terrestrial OOB (T OOB) uplink channels 38 can be added to the data transmission links 36, as shown in FIG. 1B. Each of the T OOB uplink channels 38 allows a mobile device to communicate with a base station without interfering with reception by the satellite transceiver. The T OOB spectrum may be implemented to gain spectral efficiency by allowing the satellite spotbeam downlink co-channels to be utilized by the terrestrial stations operating under the co-channel spotbeam. Each terrestrial T OOB channel in the plurality of uplink T OOB channels together with each of the plurality of downlink T channels in the plurality of dual S/T channels 34 form a terrestrial channel pair permitting communication between a base station and a mobile device. In the embodiment illustrated in FIG. 1B, the OOB spectrum portion 38 is comprised of four T OOB uplink channels and each of the four T OOB uplink channels is paired with a respective channel in four downlink T channels in the dual downlink S/T channels. Although a configuration having four channels is shown, it must be appreciated that any number of channels can be implemented. Interference is mitigated because the uplink T OOB channel is not seen by the satellite transceiver. The uplink T OOB channels 38 are out of the satellite transceiver band pass. Without this implementation, co-channel satellite spotbeam and terrestrial use of the same channels may lead to interference between the paired uplink co-channel and the satellite. A detailed description of such a method and system is provided in a related co-pending patent application Ser. No. 12/037,475 entitled "Method and System for improving the Spectral Efficiency of a Data Communication Link", the contents of which are incorporated herein by reference.

A plurality of Power OOB downlink channels 40 can also be added. Because in earth-space communications, most power in a satellite is used for the space-to-earth segment transmission, adding a power OOB downlink can save satellite power. Earth-to-space segment transmission can use channels 36 which are allocated to the Satellite. The use power OOB addresses the downlink path. The power OOB spectrum 40 which comprises one or more power OOB channels 42 is used for base station-to-mobile device transmission. A series of strategically located base stations can be implemented to provide a transmit only replacement for the satellite in certain areas. Each power OOB channel 42 in the one or more power OOB channels 40 can provide a replacement to a downlink satellite S channel in the plurality of downlink S channels in the dual S/T channels 34. Although four power OOB channels are illustrated being used in FIG. 1B, any number of power OOB channels can be used. The number of power OOB channels does not need to match the number of spot beams in a spot beam reuse pattern or the number of downlink S channels in the dual S/T downlink channels 34. For example, in a minimal configuration, the same power OOB channel, i.e., one power OOB channel can be used in every spot beam (spot beam 1, spot beam 2, etc.). In addition, in one configuration, the same power OOB channel can be used for each of the plurality of S channels in the dual S/T channels, for example. A portion or the total downlink traffic in any spotbeam can be "unloaded" from the satellite downlink and instead handled by a terrestrial base station transmitter. These base stations can be located anywhere inside a spot beam footprint of the satellite, as desired. This allows the satellite transceiver to conserve power. The power of the satellite can then be utilized to support other communication channels, thus increasing the total capacity of the communication network.

The user carrying a mobile device can be supported by a terrestrial based downlink path (a power OOB channel 42 in the plurality of power OOB channels 40) and a satellite based uplink path (a S uplink channel in the plurality of S uplink channels 36). The terrestrial downlink, i.e., power OOB channel, can be time synchronized to the satellite in order to insert the appropriate delay into the transmitted signal so that it is properly time shifted so as to account for the time delays associated with propagation delay over distance associated with the longer satellite supported uplink path.

The conventional Mobile Satellite System (MSS)/Auxiliary Terrestrial Component (ATC) standard provides that channels unused by the satellite transceiver can be used for base station-to-mobile device communications within one spot beam of the satellite transceiver. (Note that ATC is also referred to as TMA.) Thus, some channels, for example, channels B, C and D can be used as terrestrial channels, for example as ATC/TMA channels for base station to mobile device communications, in accordance with MSS/ATC standard.

Figure 1C:
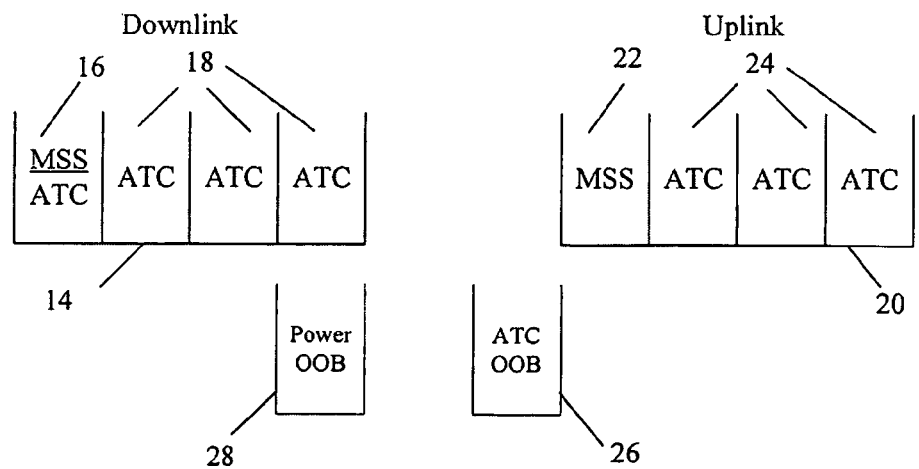
FIG. 1C illustrates an allocation of channels in a satellite spot beam, according to another embodiment of the present invention.

FIG. 1C illustrates an allocation of channels in a satellite spot beam in an MSS/ATC system, according to another embodiment of the present invention. In accordance with the MSS/ATC standard, one or more of a plurality of channels may be used as either a MSS channel or a terrestrial downlink channel (e.g., an ATC channel) in downlink transmission 14. For example, one channel 16 can be used as a dual MSS/ATC channel. The remaining channels 18 can be used in terrestrial channels (e.g., ATC channels). Furthermore, in accordance with the co-channel reuse, the modified data transmission uplinks 20 can include a MSS channel 22 in addition to terrestrial channels (e.g., ATC channels) 24.

Similar to the embodiment illustrated in FIG. 1B, in order to reduce or minimize the use of satellite power, Out Of Band (OOB) spectrum can be used instead of the space-to-earth portion of the MSS (downlink portion of the MSS) in the complementary terrestrial system (e.g., ATC/TMA or TME). The OOB spectrum is outside the spectrum allocated for MSS/ATC use. The OOB spectrum is a portion of a spectrum which may be equal to a spectrum allocation of any channel transmitted in a data transmission link. The same OOB spectrum can be used for any spot beam from a satellite transceiver. For example, the OOB spectrum may include any spectrum with adequate propagation characteristics for mobile or portable use.

As shown in FIG. 1C, an ATC OOB uplink channel 26 is added to the data transmission links 20. The ATC OOB uplink channel 26 allows a mobile device to communicate with a base station without interfering with reception by the satellite transceiver. The ATC OOB spectrum may be implemented to gain spectral efficiency by allowing the satellite spotbeam downlink co-channels to be utilized by the terrestrial stations operating under the co-channel spot beam. Without this implementation, co-channel satellite spotbeam and terrestrial use of the same channels may lead to interference between the paired uplink co-channel and the satellite.

As shown in FIG. 1C, a power OOB downlink channel 28 is also added, because in earth-space communications, most power in a satellite is used for the space-to-earth segment transmission. Earth-to-space segment transmission can use the spectrum which is allocated to the Satellite. The use of power OOB addresses the downlink path. The power OOB spectrum 28 is used for base station-to-mobile device transmission. As stated above, by their design constraints, satellites have a limited amount of total power to be allocated to communications, and the majority of the consumed power is relegated to transmit power associated with operating the transmitters supporting downlink communications. By implementing a series of strategically located base stations which provide a transmit only replacement for the satellite in certain areas, a portion of the total downlink traffic in any spotbeam can be "unloaded" from the satellite downlink and instead handled by a terrestrial transmitter. These base stations can be located anywhere inside a spot beam footprint of satellite, as desired. These base stations can be placed, for example, in ATC/TMA or TME regions in locations where ATC/TMA or TME base stations are located. The base stations can also be placed independently at high points so as to increase coverage of areas surrounding the TPC/TMA areas. Alternatively, or in addition, these transmitters can operate at a higher power. Increase of coverage area can conserve satellite power. These base stations transmit in the power OOB spectrum 28. This allows the power constrained satellite transceiver to conserve power. The power of the satellite can then be utilized to support other communication channels, thus increasing the total capacity of the communication network. However, instead of using the power OOB spectrum 28 to provide a transmit only replacement for the satellite in certain areas, an ATC channel can also be used if available without interference. However, the ATC spectrum is used primarily to enhance terrestrial capacity. The use of OOB spectrum can be subdivided in narrow channels with relatively high power which can increase the terrestrial coverage area. Because there is no additional power drain on the satellite associated with receiving, the satellite continues to support the uplink portion of the communication channel. Therefore, the user carrying a mobile device is being supported by a terrestrial based downlink path and a satellite based uplink path. The terrestrial downlink can be time synchronized to the satellite in order to insert the appropriate delay into the transmitted signal so that it is properly time shifted so as to accommodate the time delays associated with propagation delay over distance associated with the longer satellite supported uplink path.

Figure 2:
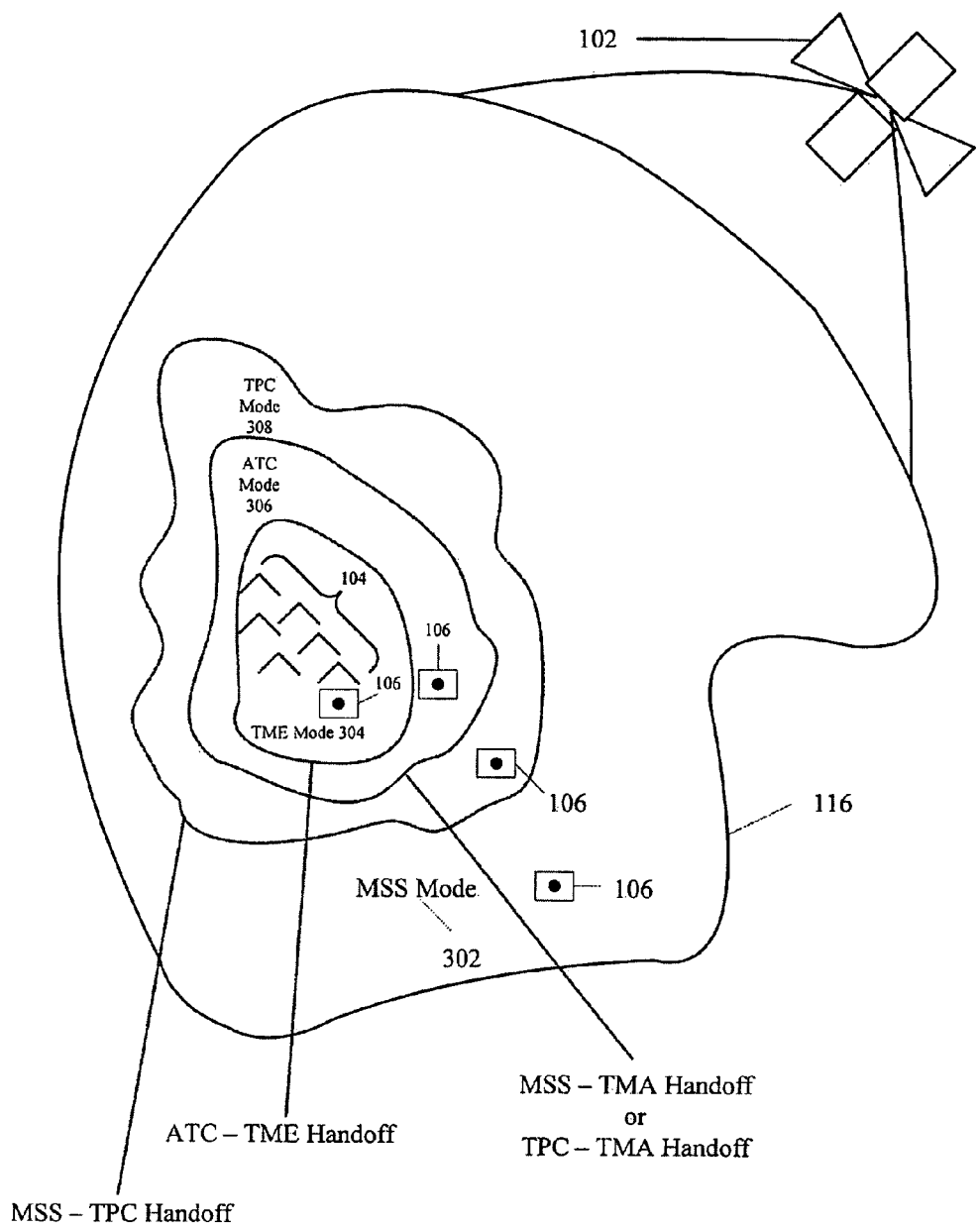
FIG. 2 shows hand-off boundaries between Mobile Satellite System (MSS) mode and terrestrial modes Auxiliary Terrestrial Component (ATC) or Terrestrial Mode ATC (TMA), Terrestrial Mode Enhanced (TME) and Terrestrial Power Conservation (TPC) mode, according to one embodiment of the present invention.

FIG. 2 illustrates hand off boundaries between MSS mode, TPC mode, ATC/TMA mode, and TME mode, according to an embodiment of the present invention. As shown in FIG. 2, a spot beam 116 illuminates an area that encompasses a mobile device 106. Within this area, there are four communication modes (MSS, TPC, ATC, TME) in which the satellite transceiver 102 may communicate bi-directionally with the mobile devices 106. Similarly, in some of this area, the base stations 104 may also communicate bi-directionally with the mobile devices 106.

The MSS mode region 302 is the region where the mobile devices 106 may communicate bi-directionally with the satellite transceiver 102. In MSS mode region 302, the mobile device 106 is out of range of base stations 104. The ATC mode region 306 and the TME mode region 304 are regions where the mobile device 106 can communicate with either base stations 104 or satellite transceiver 102. Furthermore, FIG. 2 also shows the various boundaries at which the mobile device 106 is handed off between the various modes.

MSS mode refers to the mode where a mobile device 106 is communicating via a satellite transceiver 102 on a portion of the radio spectrum assigned for satellite transceiver 102 communications (i.e. MSS communication downlink and uplink) in accordance with the conventional MSS standard. For example, MSS mode may be employed where terrestrial communications with a base station 104 may not be possible. Channels employed for spot beams adjacent to satellite spot beam 116 can be governed by conventional rules to avoid adjacent spot beam interference.

ATC (also called TMA) mode refers to the mode where a mobile device 106 is communicating via a terrestrial base station 104 within a spot beam 116 of a satellite transceiver 102. The spectrum is assigned for both terrestrial base stations-to-mobile device communication links and/or mobile device-to-terrestrial base station communication links employing conventional MSS/ATC standards. For example, a channel can be assigned for satellite communications and remaining channels can be used for terrestrial communications.

TME mode refers to the mode where a mobile device 106 is communicating via a terrestrial base station 104 using the spectrum assigned using the conventional MSS/ATC standards, the spectrum assigned for the MSS communication link for an additional terrestrial base station-to-mobile device communication link and the out of band (OOB) spectrum that is not part of the portion of spectrum assigned to the MSS communication link for an additional mobile device-to-base station communication link.

ATC/TMA mode region 306 between TME mode regions 304 and MSS mode region 302 cause mobile devices 106 which may have been receiving communications from base station 104 using a channel shared with a downlink from the satellite transceiver in TME mode regions 304 to switch to a channel not used for satellite communications in accordance with the MSS/ATC standard before the mobile devices 106 enter the MSS mode regions 302. Here, it is assumed that ATC/TMA mode coverage is greater than TME mode coverage. That is, TME mode allows the utilization of more channels. In this case, ATC covers any given geographical area which is covered by TME.

Terrestrial Power Conservation (TPC) mode region 308 refers to a mode where a mobile device can transmit (mobile device to satellite uplink) on the same spectrum as it can transmit in MSS mode. A terrestrial base station (in a base station to mobile device downlink) can use OOB assigned for power consideration. As a mobile device 106 reaches the coverage boundary of the TPC coverage 108, it is handed off from MSS mode to TPC mode. There is no interference between the MSS mode and TPC mode once the hand off has taken place. Furthermore, prior to the handoff there is also no interference as the mobile device 106 is transmitting/receiving in MSS mode region 302.

In addition, only a fraction of earth-to-space link part of the spectrum is used in any given spot beam 116 because of the frequency reuse.

Figure 3A:
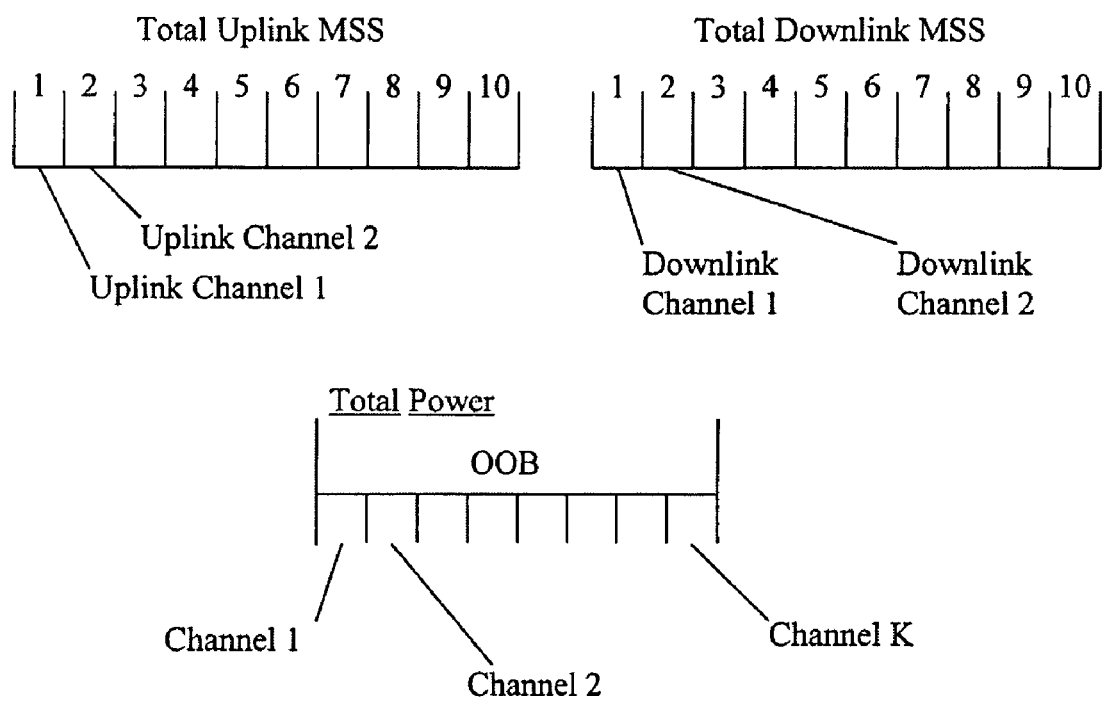
FIGS. 3A, 3B and 3C illustrate an allocation of channels in a handoff process between the various modes, according to an embodiment of the present invention.
Figure 3B:
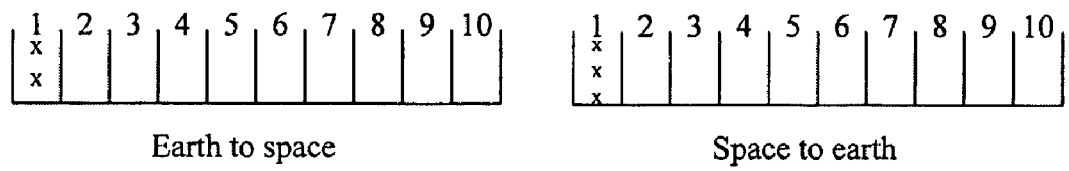
Figure 3B:
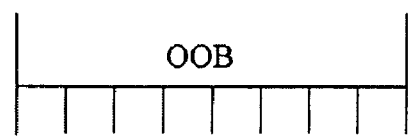
Figure 3C:
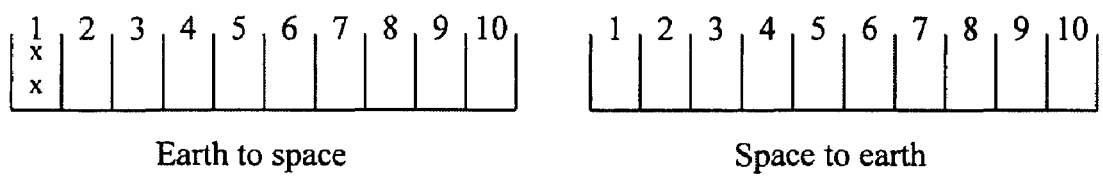
Figure 3C:
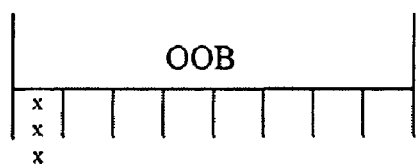

FIGS. 3A-3C illustrate the handoff concept between MSS-to-TPC in more detail, according to an embodiment of the present invention. As illustrated in FIG. 3A, in the uplink MSS mode, channel 1 can use a portion of the spectrum (e.g., uplink channel 1), channel 2 can use another portion of the spectrum (e.g., uplink channel 2), etc. In the downlink MSS mode, channel 1 can use a portion of the spectrum (e.g., downlink channel 1), channel 2 can use another portion of the spectrum (e.g., downlink channel 2), etc. As described in the above paragraphs, a power OOB downlink channel is added to the downlink MSS so as to conserve satellite power. Hence, in the TPC mode, the power OOB channel spectrum is used to support the downlink communications. The OOB channel spectrum can have any number of channels 1, 2, . . . , K, limited only by the size of each channel and the total spectrum.

For example, prior to hand off between MSS and TPC, as illustrated in FIG. 3B, when the mobile device is roaming in an MSS region, uplink channel 1 can be used for communication between the mobile device and the satellite transceiver in the uplink direction. Similarly, in the MSS mode, prior to hand off between MSS and TPC, downlink channel 1 can be used for communication between the satellite transceiver and the mobile device in the downlink direction. A handoff from MSS-to-TPC Mode maintains the Up-Link on the same uplink channel, for example uplink channel 1 in FIG. 3B, while only the downlink is handed off to the TPC terrestrial station. However, if the downlink connection to the satellite is maintained after the hand-off, it may provide more robustness in the communication path, at the cost of lost capacity due to the redundancy of the communication, as will be explained further in the following paragraphs.

After hand off, as illustrated in FIG. 3C, downlink from satellite to the mobile device is handed off in TPC mode to power OOB spectrum (e.g., OOB channel 1) and there is no overlap with the MSS Spectrum. Also, note that power OOB channels 1, 2, . . . , K do not need to match the number of spot beams in a spot beam reuse pattern. In fact, in a minimal configuration, the same power OOB channel can be used in every spot beam (spot beam 1, spot beam 2, etc.) with some cases of interference at the spot beam geographical edges. In the other direction (i.e., TPC-to-MSS handoff mode), the reverse takes place.

It should be noted that the TPC transmitters can operate at a higher power and therefore can have a better coverage footprint when deployed at the same base stations which use ATC and/or TME because the TPC system is using the satellite to perform uplink support, it does not encounter the same terrestrial coverage limitations of the mobile uplink path. In normal ATC or TME systems, base station power coverage is limited to no more than that which provides a coverage footprint equal to the range achievable by a power limited uplink device.

In this example of a system usage, same parameters (module channel protocol, coding, etc.) are used. However, these parameters do not have to be the same. These parameters can be select as desired by a system designer.

Once the MSS-TPC handoff takes place, satellite power is conserved. The same can be achieved by ATC and TME. However, there is greater opportunity to conserve satellite power because of the extended geographic footprint of TPC (as illustrated for example in FIG. 2). In addition, this can also significantly reduce the possibility of interference between TME, ATC/TMA and MSS mode. The possibility of interference between TME, ATC/TMA and MSS mode is reduced because the terrestrial transmission is shifted to power OOB in the downlink direction while in the uplink direction the same MSS channel is kept for the transmission. The hand off process can be in the sequence of MSS-to-TPC-to-ATC-to-TME. However, the hand off process can be in any order sequence and does not need to be in this order.

In the other direction, while a mobile device is moving away from terrestrial coverage, handoff is likely to be in the reverse direction (i.e., TME-to-ATC-to-TCP-to-MSS).

Although the embodiment described above employs a satellite transceiver, it must be appreciated that the above method of shifting the downlink transmission to a channel in the power OOB spectrum can be applied to a network configuration where any transceiver, such as a terrestrial transceiver, is employed. Such transceiver can have some power constraints, i.e. a power constrained transceiver. For example, one can use the same concept to avoid interference from a high-site, such as a satellite or an overlay-coverage with minimal capacity and power constraints, to provide a geographic buffer, albeit power conservation is not a big concern for terrestrial base stations unlike a satellite transceiver.

Figure 4:
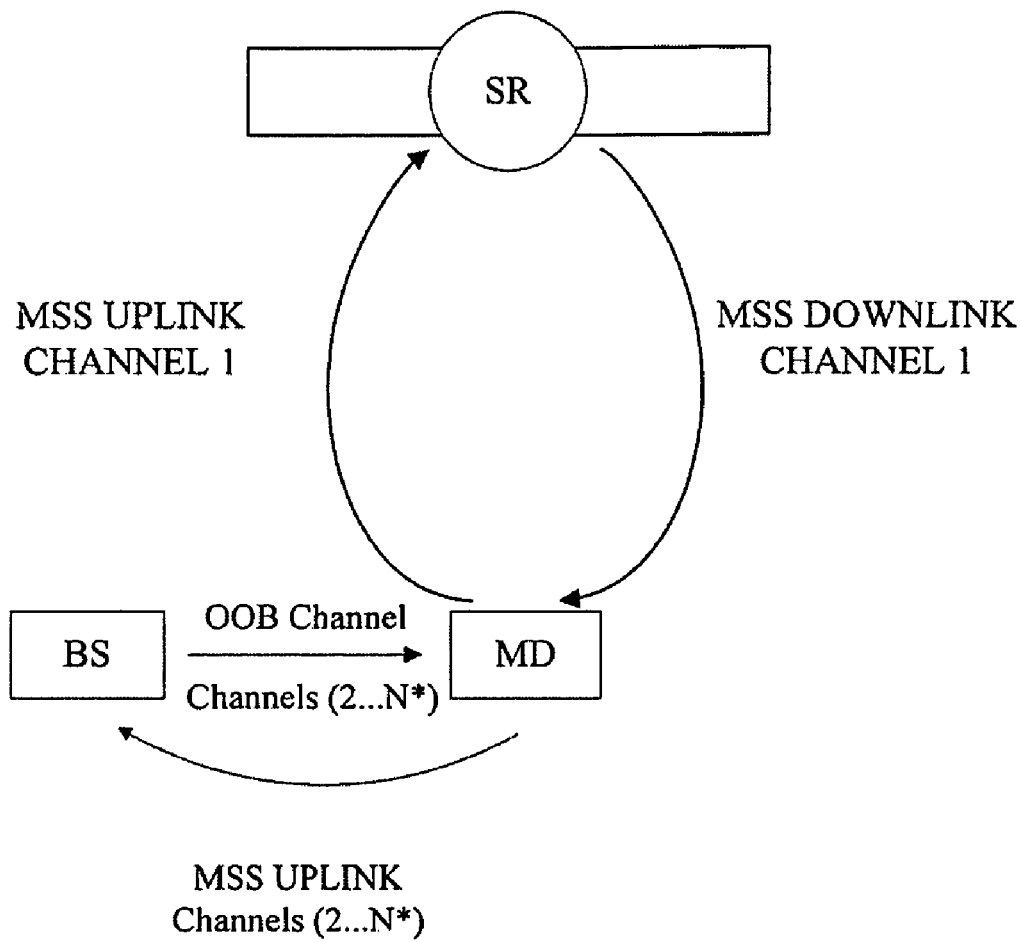
FIG. 4 depicts a communication configuration between a mobile device and a satellite transceiver and a base station, according to an embodiment of the present invention.

FIG. 4 depicts a communication configuration between a mobile device and a satellite transceiver and a base station, according to an embodiment of the present invention. As shown in FIG. 4, the mobile device MD can communicate with the satellite receiver SR bidirectionally. In the uplink direction, the mobile device MD can communicate with the satellite transceiver SR using an uplink satellite channel (for example in the MSS mode using any channel of the spectrum such as uplink channel 1). Similarly, in the downlink direction, the satellite transceiver can communicate with the mobile device MD using a downlink satellite channel (for example in the MSS mode using any channel of the spectrum such as downlink channel 1). In addition, the mobile device MD can communicate also with the base station BS. In the uplink direction, the mobile device MD can communicate with the base station BS using a terrestrial channel (for example, in the MSS/ATC mode, using any other channel of the spectrum not used for the communication between the mobile device and the satellite transceiver, i.e. communicate using channels 2, 3, ..., N). In the downlink direction, the base station can communicate with the mobile device MD in the TPC mode using any available OOB channel. However, instead of an OOB channel, a conventional ATC channel can be used, if the ATC channel is available or if desired to conserve the OOB channel for other usage. In this example, it is assumed that the mobile device MD is located in a region covered by beam spot 1 of the satellite transceiver. However, a same analysis can be performed when the mobile device is a region covered by any other beam spot of the satellite.

In this embodiment, the mobile device MD is configured to receive and transmit data in multiple modes (MSS, ATC and TPC). Indeed, the mobile device MD is configured to receive data from and transmit data to the satellite transceiver SR via MSS uplink and downlink channels and transmit to and receive data from the base station BS via MSS uplink and OOB channels. As a result, the mobile device MD can receive redundant data from the satellite transceiver SR via an MSS downlink channel (e.g., MSS downlink channel 1) and receive from the base station BS via a OOB channel. Similarly, the mobile device can transmit the same set of data to the satellite transceiver SR via an MSS uplink channel (e.g., MSS uplink channel 1) and transmit the same set of data to the base station BS via an MSS uplink channel (e.g., MSS uplink channel 2). In this way, network redundancy and frequency diversity can be achieved which provides a more robust overall network.

Furthermore, another aspect of this embodiment is to provide more data security by dividing a data set into two or more sub data sets, the two or more sub data sets can be transmitted over the MSS mode and TPC mode. For example, a first sub data set can be transmitted over the MSS mode while a second sub data set can be transmitted over the TPC mode. The above network configuration can be used, for example, in tactical or emergency service communications requiring redundancy or in sensitive data communications requiring data security.

In TPC mode, the MSS uplink spectrum can be shared from neighbor spot beams (can also use a regular ATC OOB as described above and illustrated in FIG. 1A). Similarly, with reference to FIG. 1B, the uplink S channels can be shared from neighboring spot beams or r OOB channel or channels can also be used.

Figure 5:
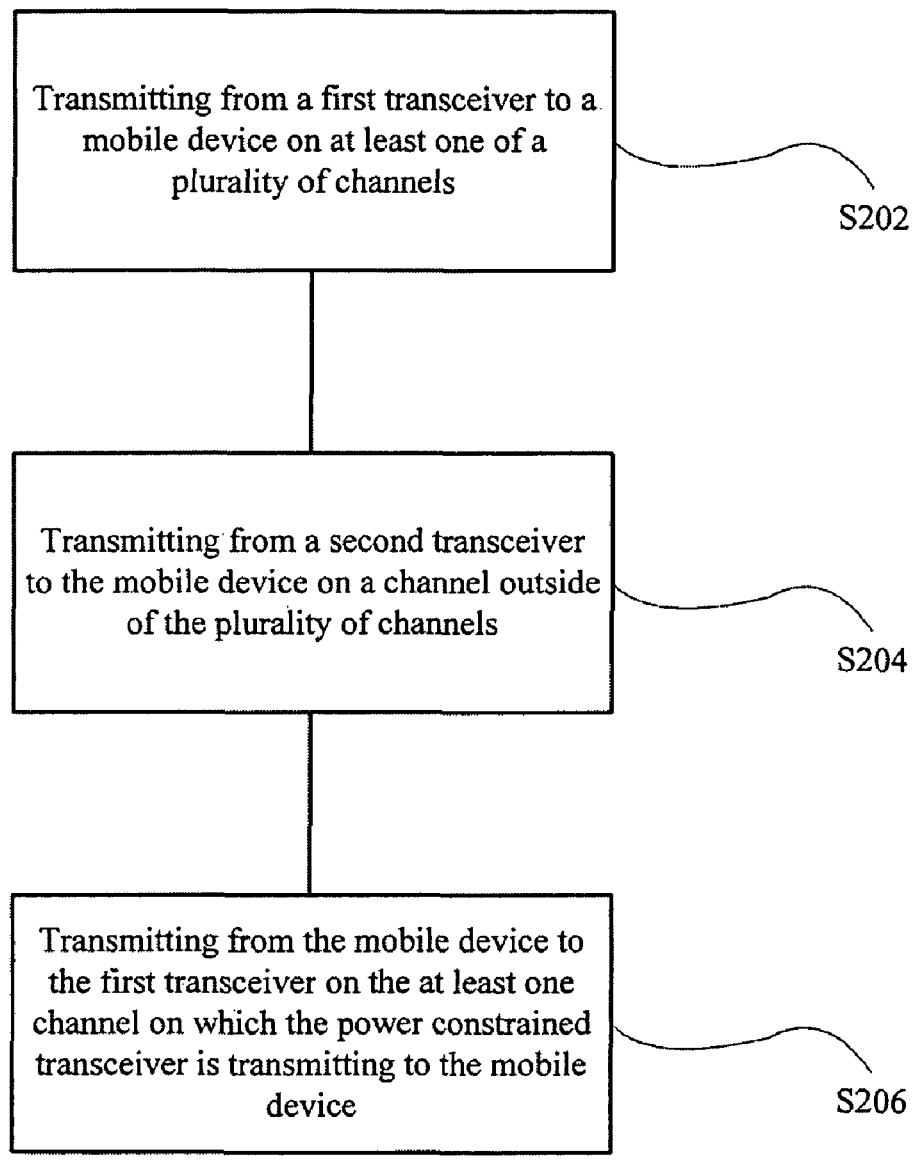
FIG. 5 illustrates a flow chart describing a method for communicating between a mobile device, and a first transceiver such as a satellite transceiver and a second transceiver such as a base station, according to an embodiment of the present invention.

FIG. 5 illustrates a flow chart describing a method for communicating between a mobile device, a first transceiver and a second transceiver, according to an embodiment of the present invention. The second transceiver is positioned in an area covered by a spot beam from the first transceiver. A first signal received by the mobile device from the first transceiver has lower energy than a second signal received by the mobile device from the second transceiver. The method includes transmitting from the first transceiver to the mobile device on at least one of a plurality of channels, at step S202. The method further includes transmitting from the second transceiver to the mobile device on a channel outside of the plurality of channels; at step S204. In one embodiment of the invention, the method further includes transmitting from the mobile device to the first transceiver on the at least one channel on which the first transceiver is transmitting to the mobile device, at step S206. In one embodiment, the first transceiver is a power constrained transceiver such as a satellite transceiver and the second transceiver is a base station.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. In fact, after reading the above description, it will be apparent to one skilled in the relevant art(s) how to implement the invention in alternative embodiments. Thus, the present invention should not be limited by any of the above-described exemplary embodiments.

Moreover, the method and system of the present invention, like related systems and methods used in the telecommunication arts are complex in nature, are often best practiced by empirically determining the appropriate values of the operating parameters, or by conducting computer simulations to arrive at best design for a given application. Accordingly, all suitable modifications, combinations and equivalents should be considered as falling within the spirit and scope of the invention.

In addition, it should be understood that the figures, are presented for example purposes only. The architecture of the present invention is sufficiently flexible and configurable, such that it may be utilized in ways other than that shown in the accompanying figures.

What is claimed is:

1. A method for communicating between a mobile device, and first and second transceivers, wherein the second transceiver is positioned in an area covered by the first transceiver, wherein the first transceiver and the mobile device can exchange data on at least one of a plurality of channels, the method comprising:
    transmitting a first signal from the mobile device to the first transceiver on at least one of the plurality of channels; and
    transmitting a second signal from the second transceiver to the mobile device on a channel outside of the plurality of channels, wherein the channel outside of the plurality of channels is a terrestrial channel, and wherein the first transceiver cannot communicate data on the channel outside of the plurality of channels.

2. The method of claim 1, wherein the channel outside of the plurality of channels is a power out of band (OOB) channel.

3. The method of claim 1, wherein the first transceiver is a satellite and the second transceiver is a base station.

4. The method of claim 3, wherein at least one of the plurality of channels is configured to be both a satellite channel for communications from the satellite transceiver to the mobile device and a terrestrial channel for communication from the base station to the mobile device.

5. The method of claim 4, wherein the at least one channel is configured to be both a Mobile Satellite System (MSS) channel and an Auxiliary Terrestrial Component (ATC) channel.

6. The method of claim 1, further comprising transmitting a third signal from the first transceiver to the mobile device on at least one of the plurality of channels.

7. The method of claim 6, wherein the third signal received by the mobile device from the first transceiver has lower energy than the second signal received by the mobile device from the second transceiver.

8. The method of claim 6, wherein the second signal and the third signal contain substantially same data.

9. The method of claim 6, wherein the second signal contains a portion of data and the third signal contains a remaining portion of the data.

10. A method for communicating between a mobile device, a base station and a power constrained transceiver, wherein the base station is positioned in an area covered by the power constrained transceiver, wherein the power constrained transceiver and the mobile device can exchange data on any of a plurality of channels, the method comprising:
    transmitting a first signal from the power constrained transceiver to the mobile device on at least one of the plurality of channels; and
    transmitting a second signal from the base station to the mobile device on a channel outside of the plurality of channels, wherein the channel outside of the plurality of channels is a terrestrial channel, and wherein the power constrained transceiver cannot communicate data on the channel outside of the plurality of channels.

11. The method of claim 10, wherein the first signal received by the mobile device from the power constrained transceiver has lower energy than the second signal received by the mobile device from the base station.

12. The method of claim 10, further comprising transmitting from the mobile device to the power constrained transceiver on the at least one channel on which the power constrained transceiver is transmitting to the mobile device.

13. The method of claim 10, wherein the power constrained transceiver is a satellite transceiver.

14. The method of claim 10, wherein the channel outside of the plurality of channels is a power Out Of Band (OOB) channel.

15. The method of claim 10, wherein the at least one of the plurality of channels is a Mobile Satellite System (MSS) channel.

16. The method of claim 10, wherein the first signal and the second signal contain substantially same data.

17. The method of claim 10, wherein the first signal contains a portion of data and the second signal contains a remaining portion of the data.

18. An apparatus for communicating with a mobile device, comprising:
    a first transceiver adapted to receive a first signal from the mobile device on at least one of a plurality of channels; and
    a second transceiver configured to transmit a second signal to the mobile device on a channel outside of the plurality of channels;
    wherein the channel outside of the plurality of channels is a terrestrial channel;
    wherein the first transceiver is adapted to be unable to communicate data on the channel outside of the plurality of channels; and
    wherein the second transceiver is positioned in an area covered by the first transceiver.

19. The apparatus of claim 18, wherein the channel outside of the plurality of channels is a power out of band (OOB) channel.

20. The apparatus of claim 18, wherein the first transceiver is a satellite and the second transceiver is a base station.

21. The apparatus of claim 20, wherein at least one of the plurality of channels is configured to be both a satellite channel for communications from the satellite transceiver to the mobile device and a terrestrial channel for communication from the base station to the mobile device.

22. The apparatus of claim 21, wherein the at least one of the plurality of channels is configured to be both a Mobile Satellite System (MSS) channel and an Auxiliary Terrestrial Component (ATC) channel.

23. The apparatus of claim 18, wherein the first transceiver is further configured to transmit a third signal to the mobile device on the at least one of the plurality of channels.

24. The apparatus of claim 23, wherein the second signal and the third signal contain substantially same data.

25. The method of claim 23, wherein the second signal contains a portion of data and the third signal contains a remaining portion of the data.

26. An apparatus for communicating with a mobile device, comprising:
    a power constrained transceiver adapted to transmit a first signal to the mobile device on at least one of a plurality of channels; and
    a base station configured to transmit a second signal to the mobile device on a channel outside of the plurality of channels;

wherein the channel outside of the plurality of channels is a terrestrial channel;

wherein the power constrained transceiver is adapted to be unable to communicate data on the channel outside of the plurality of channels; and wherein the base station is positioned in an area covered by the power constrained transceiver.

27. The apparatus of claim 26, wherein the first signal received by the mobile device from the power constrained transceiver has lower energy than the second signal received by the mobile device from the base station.

28. The apparatus of claim 26, further comprising the mobile device, wherein the mobile device is configured to transmit to the power constrained transceiver on the at least one channel on which the power constrained transceiver is transmitting to the mobile device.

29. The apparatus of claim 26, wherein the power constrained transceiver is a satellite transceiver.

30. The apparatus of claim 26, wherein the channel outside of the plurality of channels is an Out Of Band (OOB) channel.

31. The apparatus of claim, 26, wherein the at least one of the plurality of channels is a Mobile Satellite System (MSS) channel.

32. The apparatus of claim 26, wherein the first signal and the second signal contain substantially same data.

33. The apparatus of claim 26, wherein the first signal contains a portion of data and the second signal contains a remaining portion of the data.

* * * * *